United States Patent [19]

Kovac et al.

[11] 3,990,981

[45] Nov. 9, 1976

[54] WATER BASED MAGNETIC INKS AND THE MANUFACTURE THEREOF

[75] Inventors: Zlata Kovac, Somers; Barbara A. Gardineer, Mahopac, both of N.Y.

[73] Assignee: International Business Machines Corporation, Armonk, N.Y.

[22] Filed: Sept. 20, 1974

[21] Appl. No.: 507,850

Related U.S. Application Data

[63] Continuation of Ser. No. 499,956, Aug. 23, 1974, abandoned.

[52] U.S. Cl. .......................... 252/62.54; 252/62.52

[51] Int. Cl.[2] ...................... H01F 1/00; C09D 11/00

[58] Field of Search .......... 252/62.53, 62.54, 62.52, 252/62.51

[56] References Cited

UNITED STATES PATENTS

| | | | |
|---|---|---|---|
| 3,072,577 | 1/1963 | Miller | 252/62.54 X |
| 3,214,378 | 10/1965 | Hanneman | 252/62.52 |
| 3,247,117 | 4/1966 | Shoemaker et al. | 252/62.54 X |
| 3,485,758 | 12/1969 | Borucki et al. | 252/62.52 |
| 3,634,252 | 1/1972 | Graham | 252/62.54 |
| 3,647,539 | 3/1972 | Weber | 117/235 |
| 3,725,285 | 4/1973 | Denk et al. | 252/62.54 |
| 3,795,539 | 3/1974 | Di Muio | 117/235 |
| 3,804,797 | 4/1974 | Broxterman et al. | 260/29.6 E |

*Primary Examiner*—F.C. Edmundson
*Attorney, Agent, or Firm*—Sughrue, Rothwell, Mion, Zinn & Macpeak

[57] ABSTRACT

Water based magnetic ink containing non-ionic wetting agent and cationic surfactant.

31 Claims, No Drawings

WATER BASED MAGNETIC INKS AND THE MANUFACTURE THEREOF

This is a continuation of application Ser. No. 499,956, filed Aug. 23, 1974, now abandoned.

BACKGROUND OF THE INVENTION

Magnetic inks are known formed of magnetic material dispersed in a liquid carrier.

The magnetic material is typically magnetite ($Fe_3O_4$), $\gamma$-$Fe_2O_3$ and the like. The magnetic material, in extremely finely divided form of the order of submicron size, is more or less permanently suspended in a liquid carrier with the aid of dispersing agents, surfactants, and the like to form a colloidal magnetic fluid, typically referred to as a ferrofluid.

The liquid carrier employed is usually a non-aqueous solvent, often an organic solvent of the non-polar type. Examples of non-aqueous solvents usable in the preparation of ferrofluids are aliphatic hydrocarbons, such as heptane, decane, mineral oil, kerosene, and the like, halogenated hydrocarbons such as carbon tetrachloride, trichloroethylene and the like, aromatic solvents such as benzene, toluene and the like, silicone oils, etc.

The dispersing aid is included in the ferrofluid formulation to prevent aggregation of magnetic material particles in the non-aqueous solvent, which could lead to flocculation and deposition out of suspension of magnetic material. The dispersing aid, which may be one or more surfactants, wetting agents and the like, is applied to coat the surfaces of the individual magnetic particles so as to form a coating around the individual magnetic particles to prevent agglomeration or flocculation due to attraction therebetween. Aliphatic carboxylic acids having about 8 to 24 carbon atoms are known as dispersing aids for magnetic material, such as magnetite, to be colloidally suspended in non-aqueous solvents. In this regard, see U.S. Pat. Nos. 3,531,413 and 3,764,540.

For certain applications of magnetic inks it is desirable to employ water as the carrier fluid for the magnetic material in place of the more commonly used non-aqueous solvents. The present invention is directed to the preparation of colloidal suspensions of magnetic material, such as magnetite, in an aqueous medium, and the ferrofluid so produced.

Accordingly, it is an object of the present invention to provide a method for forming a colloidal suspension of magnetic particles, particularly magnetite, in water.

Another object of this invention is to provide an aqueous based magnetic ink.

A further object of this invention is to provide a specific combination of dispersing aids which can be employed to colloidally disperse magnetite in water.

SUMMARY OF THE INVENTION

In accordance with the present invention, finely divided magnetic particles are rendered water-dispersible through the aid of a combination of one or more non-ionic wetting agents and one or more cationic surface active agents.

In a preferred embodiment of this invention, the magnetic material particles are 50 to 300 A in size, more preferably 75 to 200 A, and are pre-coated with a long chain unsaturated aliphatic fatty acid about $C_8$ to $C_{24}$, such as oleic acid, linoleic acid, linolenic acid, myristolenic acid, or palmitoleic acid, to maintain desired size particles while preventing agglomeration during preparation thereof and initial water dispersion. Other aids to prevent agglomeration could be employed in this invention.

The non-ionic wetting agent is selected to provide a bridge between the lyophobic disperse phase, i.e., magnetite, and the aqueous dispersion medium.

The cationic surface active agent is selected to impart a relatively large charge on the magnetite particles, say of the order of a zeta potential of +30 to +100 mV. Quartenary ammonium salts, amines and quartenary sulfonium or phosphonium compounds are exemplary of the kinds of cationic surface active agents used in the present invention.

DETAILED DESCRIPTION OF THE INVENTION

Magnetic inks are used in magnetic ink jet printing where a stream of ink is supplied under pressure and periodically interrupted to produce droplets, which impinge upon a sheet of moving paper. To obtain printing on the paper by the ink, it is necessary that the droplets be spaced substantially uniform distances from each other, be of uniform size, and be formed at a high rate such as about $10^5$ per second.

Magnetic ink is preferably isotropic and virtually free of remanence. Magnetic ink suitable for ink jet printing is described in this invention.

In order to prepare an aqueous based magnetic printing ink, it is necessary to have available magnetic particles of small size characterized by high magnetic moment. Using magnetite as an example, the particle size range should be about 50 to 300 A, preferably about 75 to 200 A. Magnetic moment, bearing in mind the above disclosed use for aqueous magnetic inks of the present invention, should desirably be within the range of about 65 to 80 emu./gram of dried, e.g., air or vacuum, magnetic material, preferably about 70 emu./gram. Dispersed magnetite of size and magnetic moment disclosed above, is available from a number of commercial sources such as Sherritt Gordon Mines, Ltd., Canada, or may be prepared in a manner well known in the art. For example, the following general process may be employed.

Ferric chloride and ferrous chloride are dissolved in separate bodies of water to form solutions thereof. The solutions are mixed in amounts to maintain the molar ratio $Fe^{+3}/Fe^{+2}$ slightly under the theoretical value of 2.0 without de-aerating the solutions. Oxygen in the solution will oxidize some ferrous ions to ferric ions. Magnetite, $Fe_3O_4$, can be formed by chemical precipitation of the ferrous-ferric mixture with base, such as ammonium hydroxide. In order to favor a high rate of magnetite nucleation coupled with a slow rate of particle growth, chemical precipitation can be carried out at low temperatures, for example, in an ultrasonic bath maintained at about 5° to 12° C. The pH of the mixture during chemical precipitation for deposition of magnetite is maintained between about 8.9 and 10.2, preferred pH is 9.5, with the amount of hydroxide used being adjusted accordingly.

In order to aid in the prevention of agglomeration of magnetite during and immediately subsequent to chemical precipitation, a dispersing aid is added to the precipitation mixture within a few seconds of hydroxide addition. Ancillary to agglomeration prevention, the dispersing aid will also help maintain desired small particle size. The dispersing aid is selected from those materials known to prevent inter-particle attraction between individual magnetite particles. As discussed above, 8 to 24 carbon atom aliphatic monocarboxylic acids can be employed for this purpose. Finally, the carboxylic acid coated magnetic particles in aqueous suspension are heated to about 60° to 100° C., to increase the magnetic moment thereof and the pH of the mixture is decreased from about 8 to 6 to aid in precipitation of the coated magnetite particles. Then, the particles are rinsed with distilled water to remove $NH_4Cl$ salt and separation can be carried out in any conventional manner, such as by use of the ultracentrifuge.

Once magnetite particles of the preferred 75 to 200 A size have been obtained or prepared as above, they are rendered water dispersible to form a colloidal dispersion in water by dispersing them in combination with the two-component dispersing aid of the invention. Both non-ionic and cationic are absorbed on the surface of the magnetite particles.

The amount and type of non-ionic wetting agent is selected to provide an interfacial tension between magnetite particles and water of about 24 to 36 dynes/cm, preferably about 30 to 34 dynes per cm. Generally, about 5 to 10 weight percent based on magnetite of non-ionic wetting agent will be sufficient, preferably about 7 weight percent.

As noted above, the non-ionic wetting agent is selected to provide a bridge between the lyophobic disperse phase, i.e., magnetite, and the dispersion medium of water. Non-ionics based on polyoxyethylene, due to the hydrophilic nature of the polyoxyethylene chains, are suitable for use in the present invention. Alkylarylpolyether alcohols or alkylphenol ethers of polyethylene glycol wherein the alkyl chain is of $C_8$ to $C_{45}$ and containing from 8 to 15 oxyethylene units can be employed, for example, of the formula:

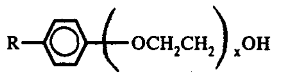

wherein R is the alkyl chain and x designates the number of oxyethylene units present. The octyl or nonyl compounds wherein x is 9 or 10, are preferred due to their excellent water solubility and reasonable viscosity, for example, nonyl phenol or tertiary octyl phenol polyoxyethylenated with 9 to 10 moles of ethylene oxide.

The amount and type of cationic surface active agent is selected to impart a zeta potential of about +30 to +100 mv, preferably about +60 to +90 mv, to the magnetite particles.

Usable cationics are quarternary compounds and amines, such as the quarternary ammonium salts, alkyl amines, quarternary sulfonium compounds, quarternary phosphonium compounds and ethoxylated quarternary ammonium compounds.

These cationics will generally be used in the concentration of 2–15 based on magnetite, preferably 6% by weight.

As examples of quarternary ammonium salts, there may be mentioned compounds of the formula:

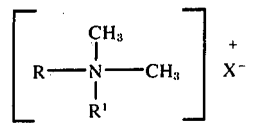

wherein R and $R^1$ are the same or different and are about 8 to 24 carbon atom branched or straight chain alkyl or benzyl radicals and preferably R and $R^1$ are $C_{12}$ to $C_{18}$ groups. A minor amount of unsaturation may be present in R and $R^1$. X is a suitable anion such as a halogen ion.

As examples of sulfonium compounds, there may be mentioned compounds of the formula:

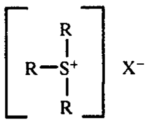

As examples of phosphonium cationics there may be mentioned compounds of the formula:

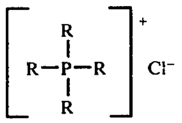

In the above sulfonium and phosphorium compounds the R groups are the same or different $C_1$ to $C_{24}$ alkyl groups, with preferably two of the R groups being methyl and the other(s) being at least $C_8$.

As examples of amine cationics, there may be mentioned long chain alkylamines. Since these surfactants are pH sensitive, care must be exercised in their use.

EXAMPLE

This example illustrates the preparation of a magnetic ink in accordance with the present invention.

As the magnetite particles, magnetite prepared by any prior art method coated with unsaturated fatty acid such as oleate, is used.

Oleate-coated magnetite particles (190 grams) are added to a suitable mixing apparatus such as an attritor along with a solution of 2 grams of potassium hydroxide and 2 grams of Ardefoam (mineral and silicone oils available from the Armak Chemical Division of Alzona, Inc., of Chicago, Illinois,) to act as a bubble breaker during the magnetic printing operation. Thereafter, a solution of cationic and nonionic surfactants is added thereto. This solution is prepared by first dissolving 30 grams of Triton N-101 (a polyoxyethylenated nonyl phenol containing 9 to 10 mols ethylene oxide per mol available from Rohm & Haas Co.,) in 100 ml. of water. Then 10 grams of Arquad 2H-75 (a dimethyldialkyl quarternary ammonium compound of 575 molecular weight wherein the dialkyl groups are 24% saturated hexadecyl, 75% saturated octadecyl and 1% unsaturated octadecenyl and having 75%* activity (available from Armak Chemical Division). Following 2 hours in the attritor, the mixture is heated in a boiling bath of water for 3 hours, after which it is cooled to room temperature and centrifuged for 45 minutes at 3000 rpm. The fluid remaining after decantation is useable as a magnetic ink. Typical data for the magnetic ink is as follows:

| | | |
|---|---|---|
| Magnetic moment | — | 25–30 cmu/gram |
| Weight of ink | — | 400–450 grams |
| Viscosity | — | 11–17 cps |
| Surface Tension | — | 28–35 dynes/cm |
| pH | — | 6–8 |
| Resistivity | — | 80–140 Ωcm |

*Weight percentages in this specification are based on 100% activity of non-ionic and cationic compounds.

While the invention has been described in detail and with reference to specific embodiments thereof, it will be apparent to one skilled in the art that various changes and modifications can be made therein without departing from the spirit and scope thereof.

What is claimed is:

1. A process for preparing an aqueous magnetic ink which consists essentially of dispersing magnetic particles in water in the presence of surface active agents consisting essentially of about 5 to 10 weight percent of a nonionic wetting agent based on weight of magnetic particles and about 2 to 15 weight percent of cationic surface active agent based on weight of magnetic particles, said nonionic wetting agent providing a surface tension between magnetic particles and water of 24 to 36 dynes per centimeter and said cationic surfactant imparting a zeta potential of about +30 to +100 millivolts to the magnetic particles.

2. The process of claim 1, wherein the magnetic particles are first coated with an agent to prevent agglomeration thereon and then are dispersed in said water.

3. The process of claim 2, wherein said agent is a $C_8$ to $C_{24}$ unsaturated aliphatic fatty acid.

4. The process of claim 3, wherein said acid is oleic acid, linoleic acid, linolenic acid, myristolenic acid or palmitoleic acid.

5. The process of claim 2, wherein the magnetic particles are 50 to 300 A.

6. The process of claim 1, wherein the nonionic wetting agent is an alkyl aryl polyether alcohol, wherein the alkyl chain contain 8 to 45 carbon atoms, and contains about 8 to 15 mols ethylene oxide per mol.

7. The process of claim 6, wherein the alkyl aryl polyether alcohol is of the formula:

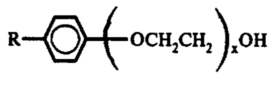

wherein R is the alkyl chain and x is 9 to 10.

8. The process of claim 2, wherein the cationic surfactant is an alkylamine.

9. The process of claim 2, wherein the cationic surfactant is a quaternary ammonium compound.

10. The process of claim 2, wherein the cationic surfactant is a quaternary sulfonium compound.

11. The process of claim 2, wherein the cationic surfactant is a quaternary phosphonium compound.

12. The process of claim 9, wherein the cationic surfactant is an ethoxylated quaternary ammonium compound.

13. The process of claim 9, wherein the compound is of the formula:

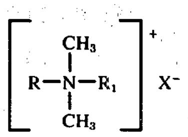

wherein R and $R_1$ are the same or different $C_8$ to $C_{24}$ straight or branched chain alkyl groups.

14. The process of claim 13, wherein R and $R_1$ are $C_{12}$ to $C_{18}$ alkyl groups.

15. The process of claim 2, wherein the magnetic particles are magnetite.

16. An aqueous magnetic ink consisting essentially of a dispersion of magnetic particles in water in the presence of surface active agents consisting essentially of about 5 to 10 weight percent of a nonionic wetting agent based on weight of magnetic particles and about 2 to 15 weight percent of a cationic surface active agent based on weight of magnetic particles, said nonionic wetting agent providing a surface tension between magnetic particles and water of 24 to 36 dynes per centimeter and said cationic surfactant imparting a zeta potential of about +30 to +100 millivolts to the magnetic particles.

17. The ink of claim 16, wherein said wetting agent and surface active agent are coated on the magnetic particles.

18. The ink of claim 17, wherein the magnetic particles are pre-coated with an anti-agglomeration agent.

19. The ink of claim 18, wherein said agent is a $C_8$ to $C_{24}$ unsaturated aliphatic fatty acid.

20. The ink of claim 19, wherein said acid is oleic acid, linoleic acid, linolenic acid, myristolenic acid or palmitoleic acid.

21. The ink of claim 18, wherein the magnetic particles are 50 to 300 A.

22. The ink of claim 18, wherein the nonionic wetting agent is an alkyl aryl polyether alcohol, wherein the alkyl chain contain 8 to 45 carbon atoms, and contains about 8 to 15 mols ethylene oxide per mol.

23. The ink of claim 22, wherein the alkyl aryl polyether alcohol is of the formula:

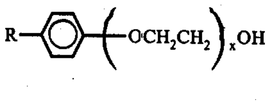

wherein R is the alkyl chain and x is 9 or 10.

24. The ink of claim 18, wherein the cationic surfactant is an alkylamine.

25. The ink of claim 18, wherein the cationic surfactant is a quaternary ammonium compound.

26. The ink of claim 18, wherein the cationic surfactant is a quaternary sulfonium compound.

27. The ink of claim 18, wherein the cationic surfactant is a quaternary phosphonium compound.

28. The ink of claim 25, wherein the cationic surfactant is an ethoxylated quaternary ammonium compound.

29. The ink of claim 25, wherein the compound is of the formula:

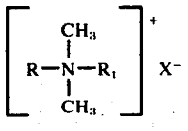
wherein R and $R_1$ are the same or different $C_8$ to $C_{24}$ straight or branched chain alkyl groups.
30. The ink of claim 29, wherein R and $R_1$ are $C_{12}$ to $C_{18}$ alkyl groups.
31. The ink of claim 18, wherein the magnetic particles are magnetite.
* * * * *